United States Patent [19]

Hirano et al.

[11] Patent Number: 4,617,902
[45] Date of Patent: Oct. 21, 1986

[54] APPARATUS FOR CONTROLLING FUEL INJECTION TIMING OF FUEL INJECTION APPARATUS

[75] Inventors: Yutaka Hirano; Kazuo Inoue, both of Higashimatsuyama; Seishi Yasuhara, Yokohama, all of Japan

[73] Assignee: Diesel Kiki Co., Ltd., Japan

[21] Appl. No.: 679,802

[22] Filed: Dec. 10, 1984

[30] Foreign Application Priority Data

Dec. 9, 1983 [JP] Japan ................. 58-231564

[51] Int. Cl.$^4$ ............................................. F02D 41/14
[52] U.S. Cl. .................................. 123/501; 123/502; 123/479
[58] Field of Search ................ 123/500, 501, 502, 479

[56] References Cited

U.S. PATENT DOCUMENTS 4,428,346 1/1984 Hoshi .................................. 123/479
4,493,302 1/1985 Kawamura .......................... 123/502
4,502,439 3/1985 Nagase et al. ...................... 123/502

FOREIGN PATENT DOCUMENTS 58-214636 12/1983 Japan .................................. 123/502

Primary Examiner—Andrew M. Dolinar
Attorney, Agent, or Firm—Guy W. Shoup

[57] ABSTRACT

In a fuel injection timing control apparatus having a sensor for generating a signal indicating the actual timing of fuel injection in response to the fuel pressure occurring at the time of fuel injection for controlling the fuel injection timing in the mode of closed-loop control using the signal as a feedback signal, when the sensor stops producing the signal, the control mode is changed to the mode of open-loop control so as to continue the control operation of the fuel injection timing, and the state of zero injection of the fuel injection pump is distinguished from the occurrence of a malfunction in the sensor.

12 Claims, 7 Drawing Figures

APPARATUS FOR CONTROLLING FUEL INJECTION TIMING OF FUEL INJECTION APPARATUS

BACKGROUND OF THE INVENTION

Field of the Invention

The present invention relates to an apparatus for controlling the fuel injection timing of a fuel injection apparatus, and more particularly to a fuel injection timing control apparatus, in which the actual fuel injection timing of a fuel injection pump is directly or indirectly detected on the basis of a signal developed in response to the fuel pressure at the time of fuel supply, whereby the fuel injection timing is controlled by a feedback control system using the detected actual fuel injection timing.

In the prior art, there have been proposed various kinds of apparatuses for electronically controlling a fuel injection apparatus so as to obtain optimum fuel injection timing. In such conventional apparatuses the actual timing of fuel injection by a fuel injection pump is generally detected by a fuel injection timing detector and adjustment of the fuel injection timing is carried out by closed-loop control in such a way that the actual timing of fuel injection is made coincident with the optimum timing of injection determined in accordance with the operating condition of the engine at each instant. Consequently, when the fuel injection timing detector of the closed-loop control system malfunctions, it is impossible to continue appropriate control of the injection timing, with the result that the level of harmful components in the exhaust gas increases and fuel consumption rises.

To avoid these problems, there has been proposed a fuel injection timing control system in which the control mode is changed from feedback control based on the output signal from the fuel injection timing detector to open-loop control using no output from the fuel injection timing detector, if any malfunction of the fuel injection timing detector is detected (Japanese Patent Public Disclosure No. 110731/82). However, a variable inductance type position detector connected with the timer piston is used as the fuel injection timing detector in the control system disclosed in this publication, and malfunctioning of the fuel injection timing detector is determined on the basis of whether or not the output level of the position detector is within a predetermined range. Therefore, the disclosed system is not applicable to an apparatus in which the fuel injection timing is detected by the use of a detector that produces an electric signal showing the actual timing of the fuel injection in response to the fuel pressure at the time of fuel supply, such as a needle valve lift sensor.

More specifically, when the fuel injection timing of the fuel injection pump is directly or indirectly detected on the basis of a signal produced in response to the fuel pressure at the time of fuel supply by, for example, a needle valve lift sensor, since the timing detector stops producing the output signal when fuel injection falls to zero because, for example, the operator releases the accelerator pedal and uses the engine to brake the vehicle, it is impossible to distinguish the zero injection state from malfunctioning of the detector.

SUMMARY OF THE INVENTION

It is an object of the present invention to provide a fuel injection timing control apparatus for a fuel injection apparatus in which malfunctioning of the fuel injection timing detector can be distinguished from the zero injection state of the fuel injection pump even in the case that the fuel injection timing of the fuel injection pump is directly or indirectly detected on the basis of a signal produced in response to the fuel pressure at the time of fuel supply to carry out feedback control of the fuel injection timing, and in which it is always possible to deal appropriately with a malfunction of the fuel injection timing detector.

It is another object of the present invention to provide a fuel injection timing control apparatus for a fuel injection apparatus, in which, in the case that the fuel injection timing of the fuel injection pump is directly or indirectly detected on the basis of a signal produced in response to the fuel pressure at the time of fuel supply to carry out feedback control of the fuel injection timing, the fuel injection timing control mode is changed to open-loop control so as to continue the fuel injection timing control even when the fuel injection timing detector malfunctions.

According to the present invention, in a fuel injection timing control apparatus for a fuel injection apparatus which has a sensor for producing an electric signal indicating the fuel injection timing in response to the fuel pressure at the time of fuel supply, an adjusting means for adjusting the fuel injection timing of a fuel injection pump and a first output means responsive to at least the electric signal for generating a control signal applied to the adjusting means in order to carry out feedback control of the fuel injection timing, the fuel injection timing control apparatus comprises a first means for generating a first signal relating to the rotational speed of the internal combustion engine to which fuel is supplied from the fuel injection pump, a second means for generating a second signal relating to the load on the internal combustion engine, a detecting means for detecting whether or not the electric signal is being produced by the sensor, a discriminating means responsive to the first and second signals and the output signals from the detecting means for discriminating whether or not the sensor is functioning properly, a second output means for generating a back-up control signal for controlling the fuel injection timing by open-loop control, a switch-over means for providing the back-up control signal to the adjusting means in place of the control signal in order to switch over the fuel injection timing control mode from feed-back control based on the control signal to open-loop control based on the back-up control signal when the detecting means detects that no electric signal is being generated by the sensor, and means for giving an indication when a sensor malfunction has been discriminated by the discriminating means.

The discriminating means discriminates whether or not the internal combustion engine is operating with the fuel injection pump operating in the region of zero injection. This discrimination can be carried out, for example, on the basis of the engine speed and the engine load. It is discriminated that the fuel injection pump is in the zero injection state when the electric signal from sensor is not produced in the case that the operating state of the engine is in the predetermined region, where the zero-injection state of the fuel injection pump is, for example, determined from the engine speed and the engine load. On the other hand, it is discriminated that the sensor has malfunctioned if there is no output from the sensor while it is discriminated that the operating state of the engine is in a region other than the predetermined region mentioned above.

Thus, it is possible to distinguish malfunctioning of the sensor from the zero injection state of the fuel injection pump when the sensor produces no output. Consequently, even if the injection timing control apparatus has a sensor which detects the fuel injection timing in response to the fuel pressure at the time of fuel supply, malfunctioning of the sensor can still be accurately detected.

According to the present invention, since the zero injection state of the fuel injection pump can be distinguished from malfunctioning of the sensor, it is easy to discriminate whether or not the sensor and/or associated devices have malfunctioned even in a fuel injection timing control apparatus which the actual fuel injection timing is directly or indirectly detected from a signal produced in response to the fuel pressure at the time of fuel supply and then the fuel injection timing control is carried out by the feedback control. Consequently, any malfunction of the sensor can be exactly detected and indicated, facilitating effective and reliable maintenance of the apparatus.

In addition, the apparatus is able to continue control of the fuel injection timing by switching over from the closed control mode (feedback control mode) to the open-loop control mode when there is no feedback signal indicating the actual fuel injection timing. As a result, the control of the injection advance angle can be continued even when the fuel injection pump is operating in the region of zero injection, and also, of course, in the case of malfunctioning of the sensor, so that the operation of the engine can be effectively maintained without any inconvenience. When the control of the injection advance angle is carried out even when operation is in the region of zero injection, it is possible to smoothly continue the control of the injection advance angle when the condition of the control is changed from the region of zero injection to the region of injection.

DESCRIPTION OF THE PREFERRED EMBODIMENTS

Figure 1:
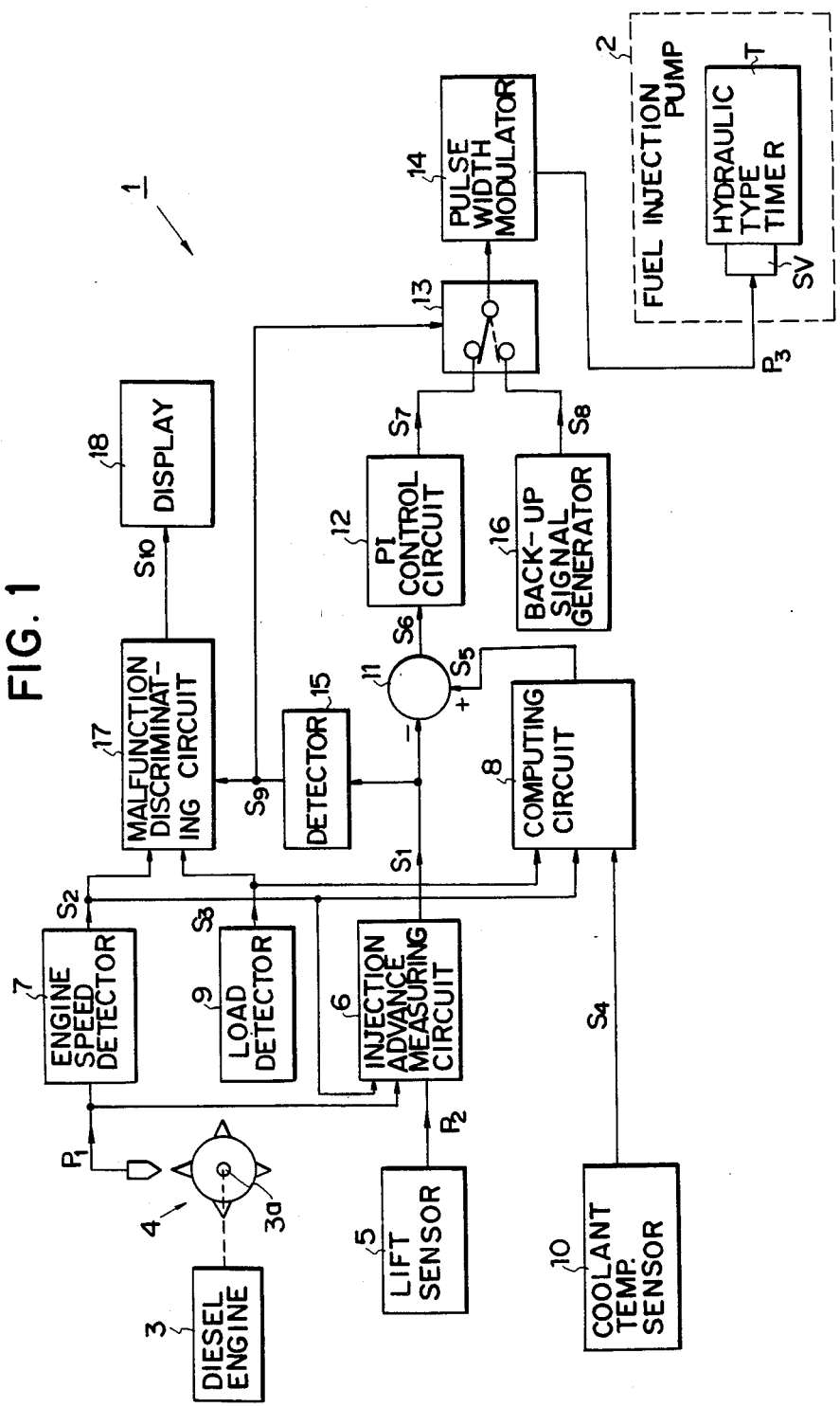
FIG. 1 is a block diagram of an embodiment of a fuel injection timing control apparatus of the invention.

FIG. 1 shows a block diagram of an embodiment of a fuel injection timing control apparatus of the present invention. The fuel injection timing control apparatus 1 is an apparatus for driving a hydraulic type timer T of a fuel injection pump 2 in accordance with the operating condition of a diesel engine 3 so as to control the fuel injection timing (that is, the injection advance angle) in accordance with the operating condition of the diesel engine 3. A conventional TDC (top dead center) sensor 4 mounted on the output shaft $3a$ of the diesel engine 3 generates first pulses $P_1$ each of which indicates the time at which the piston of each cylinder of the diesel engine 3 reaches its top dead center position.

A lift sensor 5 is mounted on the fuel injection valve (not shown) of the selected cylinder in order to detect the timing at which the needle valve of the fuel injection valve is lifted in response to a pressure rise in the fuel supply. The lift sensor 5 generates second pulses $P_2$ showing the lift timing of the needle valve, one pulse being generated each time the needle valve is lifted at the time of fuel injection. The first and second pulses $P_1$ and $P_2$ and an engine speed signal $S_2$ from an engine speed detector 7 are applied to an injection advance measuring circuit 6 in which the actual injection advance angle value $\theta_a$ is determined from the phase difference between $P_1$ and $P_2$ and engine speed as shown by the engine speed signal $S_2$, and an actual advance signal $S_1$ indicating the actual injection advance angle value $\theta_a$ is output.

To produce a signal showing the rotational speed of the diesel engine 3 at each instant on the basis of the interval between consecutive first pulses $P_1$, the first pulses $P_1$ are also applied to the engine speed detector 7 from which the engine speed signal $S_2$ showing the engine speed calculated on the basis of the first pulses $P_1$ at each instant is produced. The engine speed signal $S_2$ is applied to a computing circuit 8 for computing a target injection advance angle value $\theta_t$.

A load signal $S_3$ indicating the magnitude of the load of the diesel engine 3 and a coolant temperature signal $S_4$ indicating the temperature of the engine coolant for the diesel engine 3 are further applied to the computing circuit 8 from a load detector 9 and a coolant temperature sensor 10, respectively. In the computing circuit 8, the optimum injection advance angle for the state of operation of the diesel engine 3 at each instant is computed as a target injection advance angle value $\theta_t$ on the basis of these signals $S_2$ to $S_4$, and a target advance signal $S_5$ indicating the value of $\theta_t$ is produced.

In order to detect the difference between the target injection advance angle value $\theta_t$ and the actual injection advance angle value $\theta_a$, the actual advance signal $S_1$ and the target advance signal $S_5$ are applied to an adder 11 to add them in the signs shown in FIG. 1, so that an error signal $S_6$ corresponding to the difference between them is produced therefrom. The error signal $S_6$ is subjected to signal processing required for proportional and differential control in a PI control circuit 12, and the resulting signal is derived as a control signal $S_7$.

The control signal $S_7$ is applied as a pulse width control signal through a switch 13 to a pulse width modulator 14 which produces a driving pulse signal $P_3$ with a duty cycle corresponding to the control signal $S_7$, and the driving pulse signal $P_3$ is applied to a solenoid valve SV for adjusting the oil pressure in the hydraulic type timer T. The amount of adjustment of the injection advance angle by the hydraulic type timer T varies in accordance with the duty cycle of the driving pulse signal $P_3$, whereby the hydraulic timer T is controlled in such a way that the actual injection advance angle value $\theta_a$ is made to coincide with the target injection advance angle value $\theta_t$.

As described above, the fuel injection timing control apparatus 1 shown in FIG. 1 is provided with a closed-loop control system in which the second pulses $P_2$ from the lift sensor 5 are fed back. Thus, should the lift sensor 5 stop producing the second pulses $P_2$ for any reason, closed-loop control of the injection advance angle becomes impossible and the operation of the internal combustion engine 3 is adversely affected.

Reference number 15 designates a detector which, on the basis of the actual advance signal $S_1$, detects whether or not the production of the second pulses $P_2$ has stopped. Since the injection advance measuring circuit 6 measures the actual injection advance angle value $\theta_a$ from the difference in phase between the first pulses $P_1$ and the corresponding second pulse $P_2$ as described above, the measurement becomes impossible when the second pulses $P_2$ are not produced.

The detector 15 detects that measurement of the actual injection advance angle has become impossible from the content of the actual advance signal $S_1$, whereby it is detected that the lift sensor 5 has ceased to produce the second pulses $P_2$.

When it is detected by detector 15 that the production of the second pulses $P_2$ has ceased, the level of a detection signal $S_9$ generated by the detector 15 becomes high, and the switch 13 is switched over from the state shown by the solid line in FIG. 1 to the state shown by the broken line. As a result, instead of the control signal $S_7$, a back-up control signal $S_8$ from a back-up signal generator 16 is applied to the pulse width modulator 14. The back-up control signal $S_3$ can, for example, be determined in accordance with the amount of fuel injected from the fuel injection pump 2 at each instant. When the back-up control signal $S_8$ is selected by the switch 13 and the back-up control signal $S_8$ is applied to the pulse width modulator 14, the apparatus 1 operates in the open-loop control mode using the back-up control signal $S_8$ and it follows that the actual injection advance angle value is, for example, controlled in accordance with the amount of fuel injected.

The apparatus 1 also has a malfunction discriminating circuit 17 which, when the lift sensor 5 ceases to produce the second pulses $P_2$, discriminates whether the cause is a malfunction of the lift sensor 5 or that the fuel injection pump 2 is in the zero injection state.

The malfunction discriminating circuit 17 is responsive to the engine speed signal $S_2$ and the load signal $S_3$ and discriminates whether or not the rotational speed N of the diesel engine 3 is equal to or less than a predetermined value $N_0$ and/or the load L of the diesel engine 3 is equal to or less than a predetermined value $L_0$. That is, it is discriminated whether or not the operating condition of the diesel engine 3 is in the region designated by the oblique lines in FIG. 2. In this case, the value $N_0$ is selected to be a speed at which the diesel engine 3 is not able to run stably in normal condition and may be an engine speed lower than the idling speed. On the other hand, the value $L_0$ is selected to be a value representing a predetermined small load state at which the fuel injection pump assumes the zero injection state.

Figure 2:
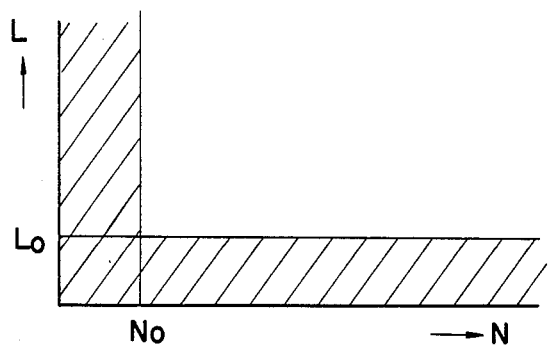
FIG. 2 is a state diagram showing the state of operation of a diesel engine.

Therefore, it can be assumed that the fuel injection pump 2 is in the state of zero injection when the diesel engine 3 operates in the region shown by the oblique lines in FIG. 2. When it is discriminated by the malfunction discriminating circuit 17 in the manner described above that the diesel engine 3 is operating outside the region designated by the oblique lines, it is then further discriminated on the basis of the signal from the detector 15 whether the second pulses $P_2$ are being generated. Then, if the second pulses $P_2$ are not being produced, it is discriminated that the lift sensor 5 has malfunctioned and a malfunction signal $S_{10}$ is produced by the malfunction discriminating circuit 17 and forwarded to a display 18 which as a consequence displays an indication of the malfunction.

Figure 3:
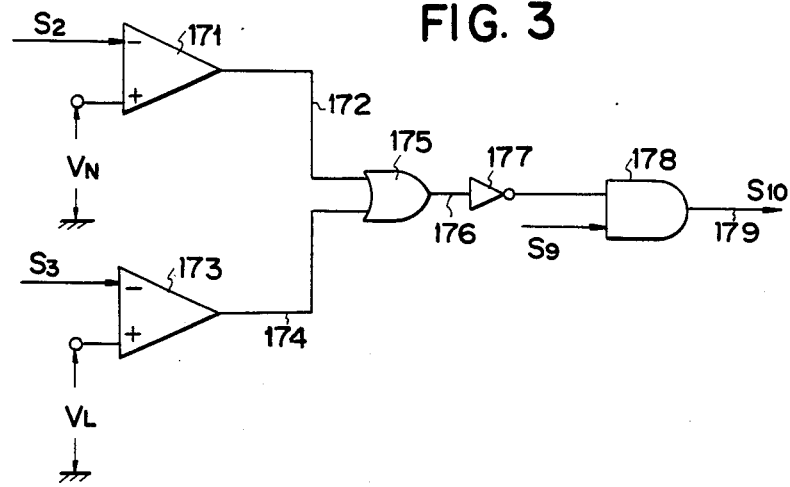
FIG. 3 is a detailed circuit diagram of the malfunction discriminating circuit of FIG. 1.

FIG. 3 is a circuit diagram of a concrete embodiment of the malfunction discriminating circuit 17. In order to discriminate whether or not the engine speed N is equal to or less than the predetermined value $N_0$, the malfunction discriminating circuit 17 has a voltage comparator 171 having a negative input terminal to which the engine speed signal $S_2$ is applied and a positive terminal to which a voltage signal $V_N$ of a level equal to the level of the engine speed signal $S_2$ at the time the engine speed N is equal to $N_0$ is applied.

Figure 4:
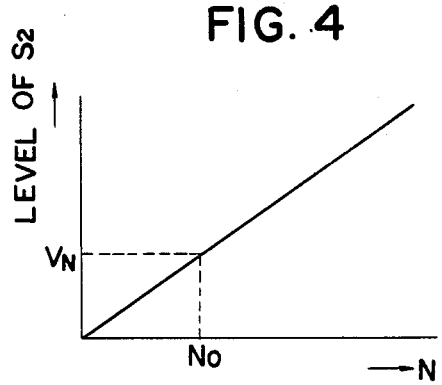
FIG. 4 is a characteristic curve showing the relationship between the level of the engine speed signal and the engine speed.

As shown in FIG. 4, the engine speed signal $S_2$ is a voltage signal whose level is proportional to the engine speed N. Therefore, the level of the output line 172 of the voltage comparator 171 becomes high when the engine speed N is not more than the predetermined value $N_0$.

In order to discriminate whether or not the engine load L is equal to or less than the predetermined value $L_0$, the malfunction discriminating circuit 17 has another voltage comparator 173 having a negative input terminal to which the load signal $S_3$ is applied and a positive input terminal to which the voltage signal $V_L$ of a level equal to the level of the load signal $S_3$ at the time the load L is equal to $L_0$ is applied.

Figure 5:
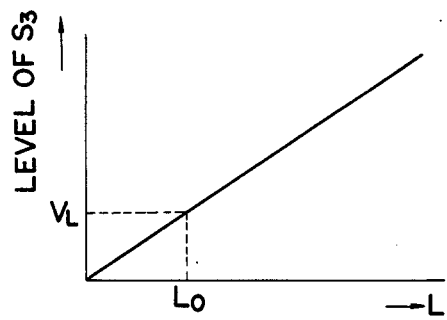
FIG. 5 is a characteristic curve showing the relationship between the level of the load signal and the engine load.

As shown in FIG. 5, the load signal $S_2$ is a voltage signal whose level is proportional to the engine load L. Therefore, the level of the output line 174 of the voltage comparator 173 becomes high when the engine load L is equal to or less than the predetermined value $L_0$.

The output lines 172 and 174 are connected to the input terminals of an OR gate 175, respectively, so that the output line 176 thereof becomes high level when at least one of the output lines 172 and 174 becomes high level. That is, the level of the output line 176 becomes high only when the operating condition of the diesel engine 3 is in the region shown by the oblique lines in FIG. 2. The signal appearing on the output line 176 is inverted in level by means of an inverter 177 and the inverted signal is applied to one input terminal of an AND gate 178. Since the detection signal $S_9$ is applied to the other input terminal of the AND gate 178, a high level signal appears on the output line 179 of the AND gate 178 only when the operating condition of the diesel engine 3 is outside the region shown by the oblique lines in FIG. 2 and the level of the detection signal $S_9$ is high (that is, the second pulses $P_2$ are not being produced by the lift sensor 5). The signal appearing on the output line 179 is output as the malfunction detection signal $S_{10}$. Thus, the malfunction detection signal $S_{10}$ indicating that the lift sensor 5 is not operating properly can be obtained.

With this construction, when the lift sensor 5 ceases to produce the second pulses $P_2$, the mode of control of the injection advance angle is changed from closed-loop control in which the second pulses $P_2$ are used as a feedback signal to open-loop control. At the same time, malfunction of the lift sensor 5 can be distinguished from the zero injection state by the malfunction discriminating circuit 17 and a malfunction indication is displayed on the display 18 when the lift sensor 5 malfunctions. Therefore, measures can be quickly taken to deal with the malfunctioning of the lift sensor 5.

In addition, the magnitude of the engine load can be detected on the basis of the position of the fuel adjusting member. In order to obtain the load signal, it is possible in a distribution type fuel injection pump to detect the position of the control sleeve or in an in-line type fuel injection pump to detect the position of the control rack. Further, the load detector 9 may be constituted in such a way that the signal indicating the engine load can be obtained on the basis of the amount of operation of the accelerator pedal, the position of the load lever or the like.

Figure 6:
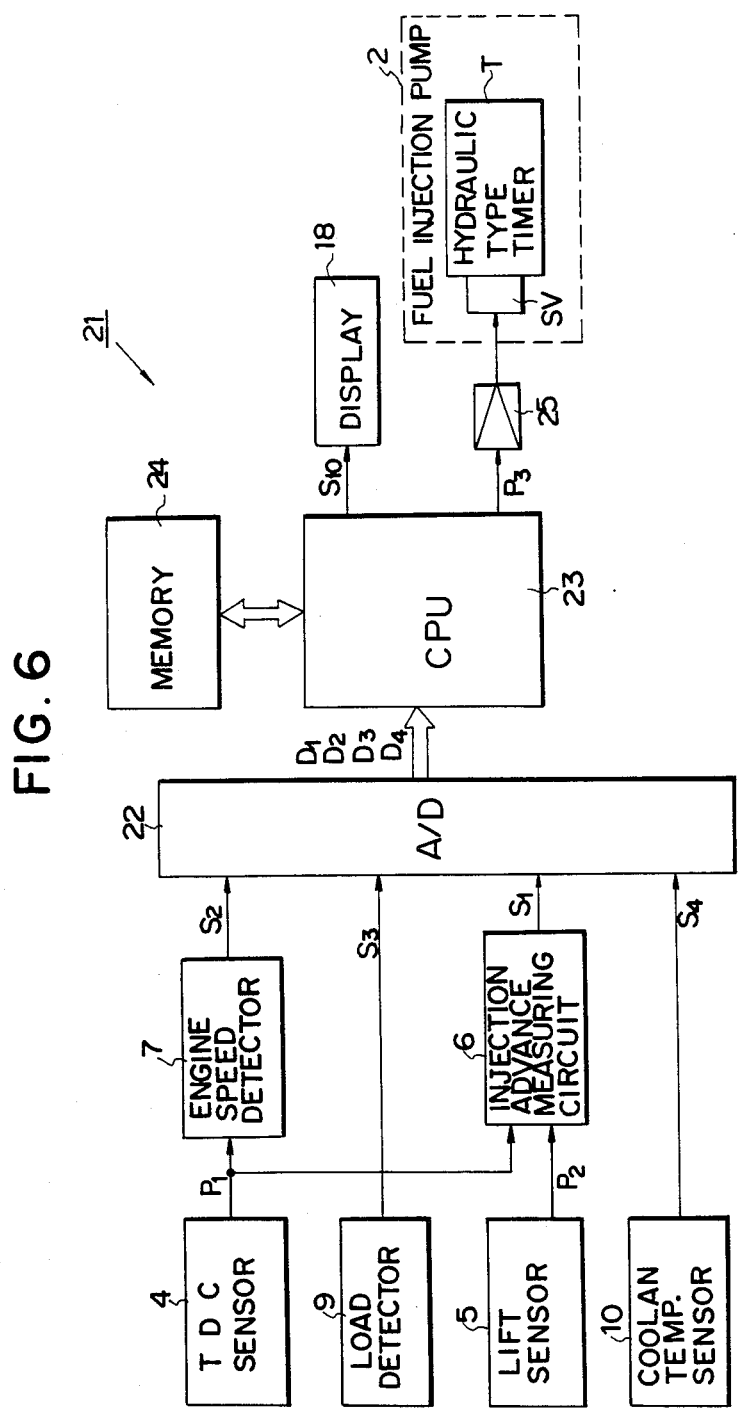
FIG. 6 is a block diagram of another embodiment of a fuel injection timing control apparatus of the present invention.

FIG. 6 shows a block diagram of another embodiment of the present invention, in which a fuel injection timing control apparatus equivalent to the control apparatus shown in FIG. 1 is constituted by the use of a microcomputer. In the fuel injection timing control apparatus 21 shown in FIG. 6, the same portion as those shown in FIG. 1 are designated by the same reference numbers and the explanations thereof will be omitted.

In the apparatus 21, the actual advance signal $S_1$, the engine speed signal $S_2$, the load signal $S_3$, and the coolant temperature signal $S_4$ are converted into digital form by an analog-digital (A/D) convertor 22 to obtain corresponding digital data $D_1$ to $D_4$. These data $D_1$ to $D_4$ are applied to central processing unit (CPU) 23. In a memory 24 is stored a program for closed-loop control of the fuel injection timing using the actual advance signal $S_1$ as a feedback signal and a program for discriminating whether, when the lift sensor 5 ceases to produce the second pulse $P_2$, the cause is a malfunction of the lift sensor 5 or that the fuel injection pump 2 is in the zero injection state. The control program is executed in the CPU 23 to carry out the same control operation as that performed by the apparatus shown in FIG. 1.

Figure 7:
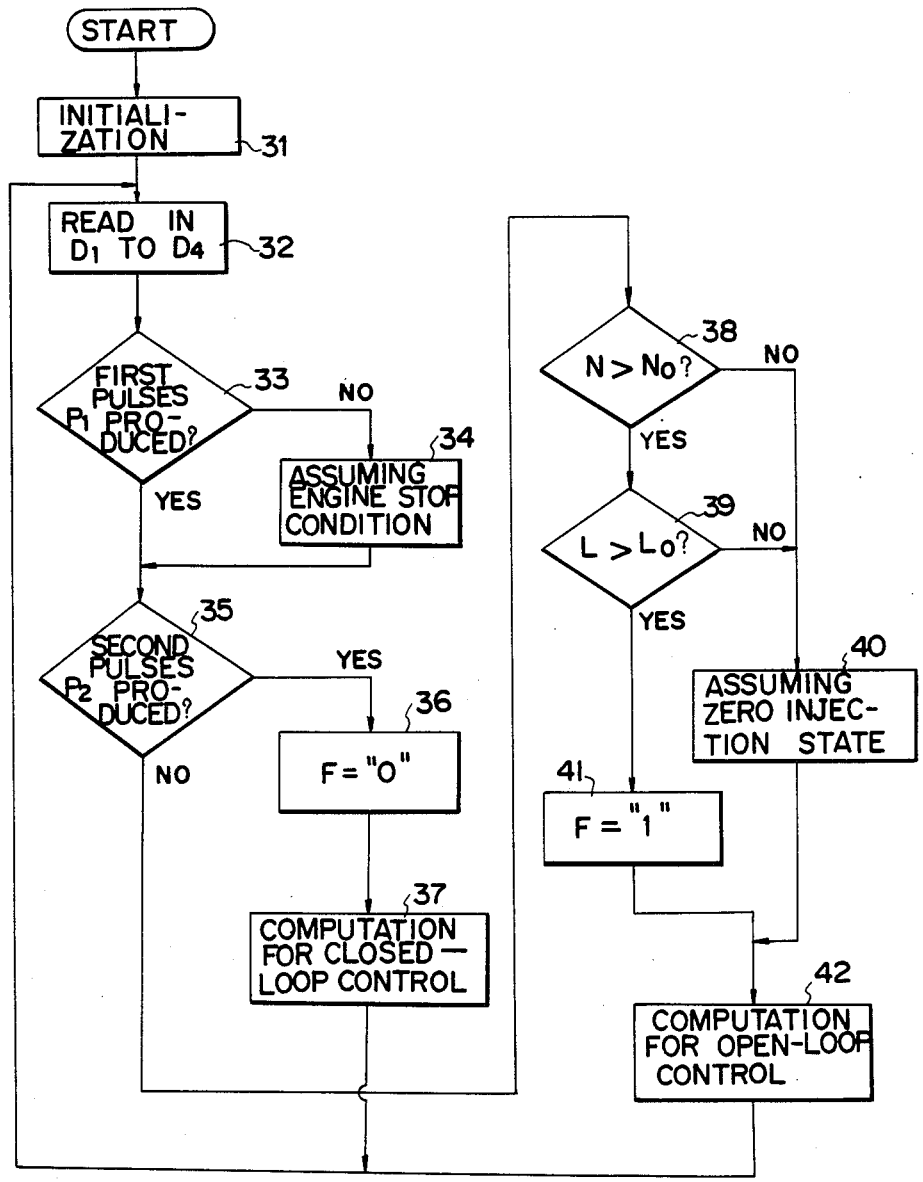
FIG. 7 is a flow chart showing an example of the program executed in the CPU shown in FIG. 6.

In FIG. 7, there is shown the flow chart of one example of the control program. After the initialization in step 31, input data $D_1$ to $D_4$ are read in the CPU 23 (step 32). Then, it is discriminated whether or not the first pulses $P_1$ are being produced in step 33. This discrimination can be easily realized, for example, by discriminating whether or not the engine is operating at an abnormally low speed on the basis of data $D_1$ showing the engine speed. When the result of the discrimination of step 33 is "NO", it is assumed that the diesel engine 3 has stopped (step 34) and step 35 is executed to discriminate whether or not the second pulses $P_2$ are being produced. In addition, when the result of step 33 is "YES", the procedure of this program is directly advanced to step 35. Discriminating whether or not the second pulses $P_2$ are produced is easily carried out on the basis of the actual advance signal $S_1$ as described hereinafter. The result of step 35 is "YES" when the second pulses $P_2$ are being produced, and a flag F which indicates whether or not a malfunction has occurred in the lift sensor 5 is reset in step 36. The level of the malfunction detection signal $S_{10}$ becomes low when the flag F is "0" and no malfunction indication is displayed on the display 18. After the execution of step 36 the computation for the closed-loop control of injection timing is executed in step 37.

In the computation executed in step 37, the target injection advance angle $\theta_t$ is computed, and the driving pulse signal $P_3$ with a duty cycle corresponding to the difference between the target injection advance angle $\theta_t$ and the actual injection advance angle indicated by the actual advance signal $S_1$ is produced by the CPU 23. The driving pulse signal $P_3$ is amplified by an amplifier 25 and the amplified signal is applied to the solenoid valve SV of the hydraulic type timer T.

When the execution of step 37 is terminated, the procedure of this program is reverted to step 32 to repeat the procedure described above.

When the lift sensor 5 stops producing the second pulses $P_2$ for any reason and the result of step 35 becomes "NO", the discrimination whether or not the engine speed N is more than the predetermined value $N_0$ and the discrimination whether or not the engine load L is more than the predetermined value $L_0$ are executed in steps 38 and 39, respectively.

In the diagram shown in FIG. 2, when the operating state of the diesel engine 3 is in the region shown by oblique lines, the result in at least one of steps 38 and 39 becomes "NO". In this case, it is assumed that the fuel injection pump 2 is in the state of zero injection (step 40). If the results of both steps 38 and 39 are "YES", that is, the operating state of the diesel engine 3 is in a region other than the region shown by the oblique lines in the diagram of FIG. 2, it is discriminated that the lift sensor 5 has malfunctioned and the flag F is set to "1" in step 41. As a result, the level of the malfunction detection signal $S_{10}$ is made high and an indication of the malfunction is displayed on the display 18.

As described above, when it is detected that the second pulses $P_2$ are not being produced (step 35), it is discriminated in steps 38 and 39 whether the lift sensor 5 has malfunctioned or the fuel injection pump 2 is in zero injection state.

After this, step 42 is executed to carry out the computation for the open-loop control of the fuel injection timing. In the execution of the open-loop control of the fuel injection timing, the actual injection advance angle value is not considered and back-up control data corresponding to the back-up control signal $S_8$ described in FIG. 1 is computed. Then, the driving pulse signal $P_3$ according to the back-up control data is produced and the open-loop control for controlling the injection advance angle is carried out.

We claim:

1. An apparatus for controlling the fuel injection timing of a fuel injection device for an internal combustion engine having a sensor for producing an electric signal indicating the fuel injection timing in response to the fuel pressure at the time of fuel supply, an adjusting means for adjusting the fuel injection timing of a fuel injection pump and a first output means responsive to at least the electric signal for generating a control signal applied to the adjusting means in order to carry out feedback control of the fuel injection timing, said apparatus comprising:

a first means for generating a first signal relating to the rotational speed of the internal combustion engine to which fuel is supplied from the fuel injection pump;

a second means for generating a second signal relating to the load on the internal combustion engine;

a detecting means for detecting whether or not the electric signal is being produced by the sensor;

a discriminating means responsive to the first and second signals and the output signals from the detecting means for discriminating whether or not the sensor is functioning properly;

a second output means for generating a back-up control signal for controlling the fuel injection timing by open-loop control;

a switch-over means for providing the back-up control signal to the adjusting means in place of the control signal in order to switch over the fuel injection timing control mode from feed-back control based on the control signal to open-loop control based on the back-up control signal when the detecting means detects that no electric signal is being generated by the sensor; and means for giving an indication when a sensor malfunction has been discriminated by the discriminating means.

2. An apparatus as claimed in claim 1, wherein said first means includes means for generating a pulse signal indicating when an engine output shaft of the internal combustion engine reaches a predetermined angular position.

3. An apparatus as claimed in claim 2, wherein said first output means has a measuring means responsive to the pulse signal and the electric signal for measuring the actual injection advance angle value at each instant, a computing means responsive to at least the first signal for computing a target injection advance angle value at each instant, means for producing an error signal corresponding to the difference between the actual advance angle value and the target advance angle value in response to the result of the measurement and the result of the computation, and means responsive to the error signal for generating the control signal.

4. An apparatus as claimed in claim 1, wherein said switch-over means is a switch means for selectively outputting either the control signal or the back-up control signal in response to the detection result of said detecting means.

5. An apparatus as claimed in claim 3, wherein said switch-over means is a switch means for selectively outputting either the control signal or the back-up control signal in response to the detection result of said detecting means.

6. An apparatus as claimed in claim 3, wherein said adjusting means is a hydraulic type timer with a solenoid valve as an actuator.

7. An apparatus as claimed in claim 6, further comprising a circuit for generating a driving pulse signal whose duty cycle is controlled in accordance with the signal derived from the switch means, whereby the solenoid valve is driven by the driving pulse signal to control the fuel injection timing.

8. An apparatus as claimed as claim 3, wherein said detecting means is responsive to the result of the measurement of said measuring means and outputs a detection result indicating that said sensor has stopped producing the electric signal when the result of the measurement is outside a predetermined range.

9. An apparatus as claimed in claim 1, wherein said discriminating means has a speed discriminating means responsive to the first signal for discriminating whether or not the engine speed is equal to or less than a predetermined value, a load discriminating means responsive to the second signal for discriminating whether or not the engine load is equal to or less than a predetermined value, a zero injection discriminating means responsive to the outputs from the speed discriminating means and the load discriminating means for discriminating whether or not the fuel injection pump is in the zero injection state, and means responsive to the detection result of said detecting means and the discrimination result of the zero injection discriminating means for generating a signal for displaying a malfunction indication when said sensor fails to produce the electric signal while the fuel injection pump is not in zero injection state.

10. An apparatus as claimed in claim 1, wherein the functions of at least said detecting means and said discriminating means are realized by the use of a microcomputer.

11. An apparatus as claimed in claim 3, wherein said discriminating means has a speed discriminating means responsive to the first signal for discrimination whether or not the engine speed is equal to or less than a predetermined value, a load discrimination means responsive to the second signal for discriminating whether or not the engine load is equal to or less than a predetermined value, a zero injection discriminating means responsive to the outputs from the speed discriminating means and the load discriminating means for discriminating whether or not the fuel injection pump is in the zero injection state, and means responsive to the detection result of said detecting means and the discrimination result of the zero injection discriminating for generating a signal for displaying a malfunction indication when said sensor fails to produce the electric signal while the fuel injection pump is not in zero injection state.

12. An apparatus as claimed in claim 3, wherein the function of at least said detecting means and said discriminating means are realized by the use of a microcomputer.

* * * * *